No. 897,811. PATENTED SEPT. 1, 1908.
R. C. BARRIE.
AUTOMATIC PNEUMATIC TIRE INFLATOR.
APPLICATION FILED JUNE 18, 1907.
2 SHEETS—SHEET 1.
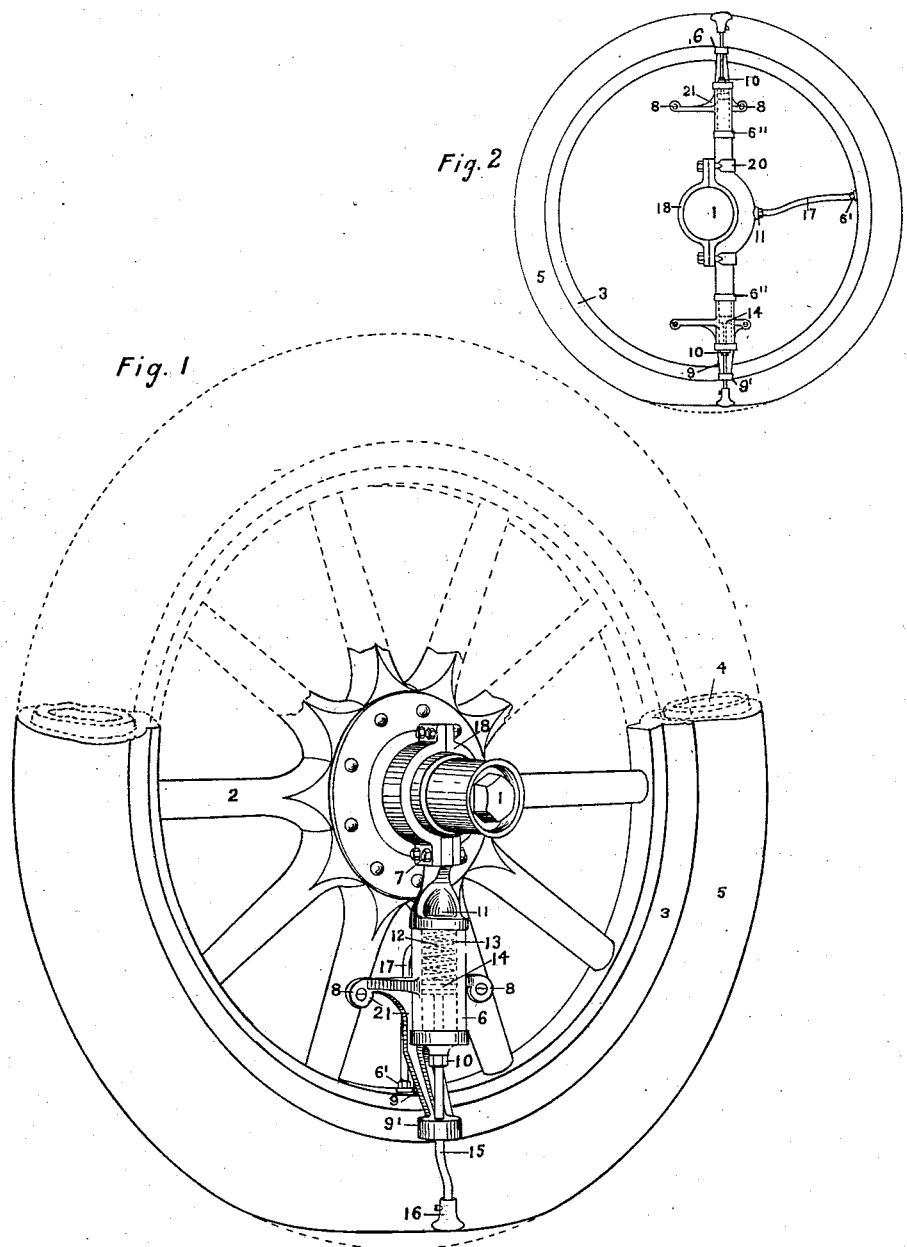

No. 897,811. PATENTED SEPT. 1, 1908.
R. C. BARRIE.
AUTOMATIC PNEUMATIC TIRE INFLATOR.
APPLICATION FILED JUNE 18, 1907.

2 SHEETS—SHEET 2.

Robert C. Barrie, Inventor

Witness
P. F. Goist
E. L. Smith

UNITED STATES PATENT OFFICE.

ROBERT C. BARRIE, OF PHILADELPHIA, PENNSYLVANIA.

AUTOMATIC PNEUMATIC-TIRE INFLATOR.

No. 897,811.    Specification of Letters Patent.    Patented Sept. 1, 1908.

Application filed June 18, 1907. Serial No. 379,673.

*To all whom it may concern:*

Be it known that I, ROBERT C. BARRIE, a citizen of the United States, residing in the city and county of Philadelphia, Pennsylvania, have invented a new and useful Automatic Pneumatic-Tire Inflator, of which the following is a specification.

My invention relates to classed mechanisms designed to inflate endless pneumatic tubes commonly known and used as "wheel tires".

Figure 3:
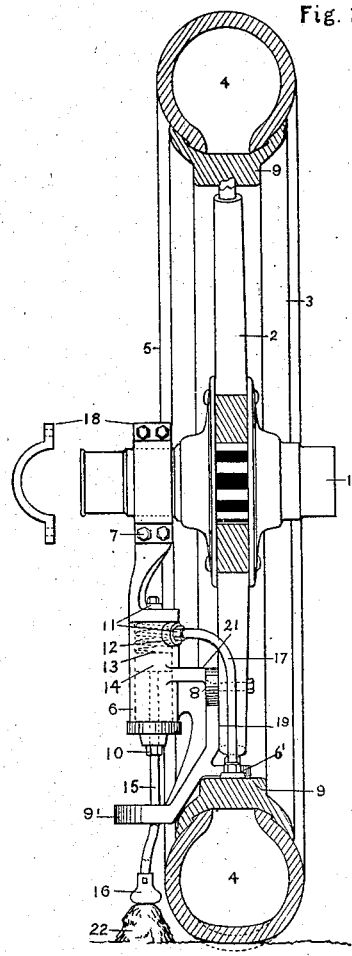
Figure 4:
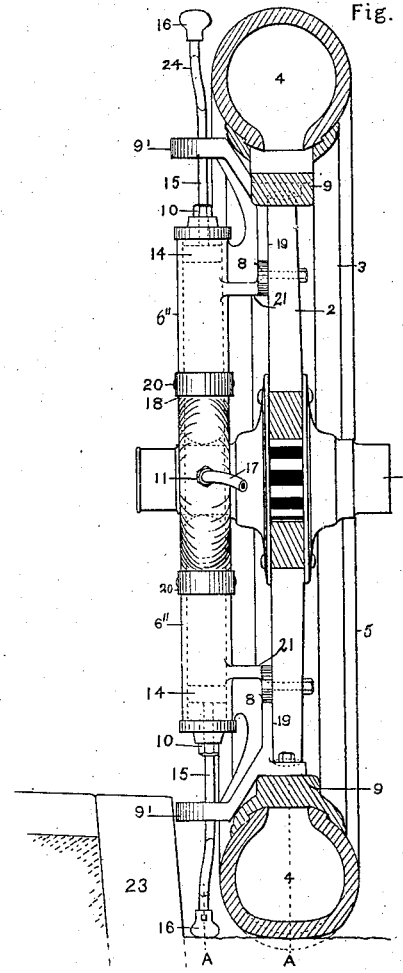

The objects of my invention are, first, to automatically maintain full rotundity of the tread surface; secondly, to estop excessive inner air pressure, by relief valves; thirdly, to secure rigid and uniform applicability to varying auto-cars; fourthly, to obtain central alinement of piston and point of contact; lastly, to protect the exposed mechanism from accidental injury. I attain these objects through the mechanism described in the accompanying drawings in which:

Figure 1 shows a perspective of my device, portraying the arrangement and application of the various parts of the single appliance. Fig. 2 presents a side elevation of a modified duplex form of my device designed to increase the number of air injectors. Fig. 3, Sheet 2 shows a front elevation of a vertical cross section of a wheel better illustrating the character, form and fastenings of the several parts of a single device. Fig. 4 presents a similar view exhibiting the parts of the modified form or duplex construction, and transposed vertical center by dotted lines A. A.

The numerals refer to similar parts in all figures, Nos. 1, 2, 3, 4, 5 indicating the hub, spokes, rim, air chamber and outer tire, respectively. No. 6, a pump cylinder, 6' wheel valve (6'' 6'') twin cylinders of like construction, 7 clamp bolts, 8, 8 spoke lugs, 9 rim lug, 9' base extension lug, 10 packing box, 11 outer valve, 12 inlet valve (not shown), 13 inclosed spring, 14 piston head, 15 piston rod, 16 foot-piece, 17 flexible tube, 18 clamps, 20 straddle bolts, 19 and 21 base plate, 22 rock or road obstruction, and 23 curbstone.

In applying the mechanism the base plate and lugs 8 and 9 are fitted to spokes and rim, the clamps adjusted to the hub (1) and properly secured by bolt fastenings 7 and 20 to secure functional stability to the mechanism and like resistance to any possible jarring or vibratory motion being imparted to the base plate through running contact of the foot-piece and road-bed; the cylinder should be set inwardly on the hub to bring rod 15 nigh to outer side of the tire (5) and the foot-piece adjusted to the full tread or circumference of the same, the flexible tube (17) is then connected to ordinary tire valve 6'.

In the modified form, Fig. 2 and Fig. 4, the elongated cylinder is given a semi-circular bend to bring the ends parallel and vertically in line with the vertical center of the hub (1) and secured thereto by clamps and yoke bolts the ends being provided with similar base and lug fastenings as in the single form, the extending lug 9' is made sufficiently strong to guide and guard the piston rod 15 from accidental contact with road obstructions (22) or street curbing (23).

The mechanism will operate as follows:—Before starting the tire is inflated to sustain the load, with a minimum depression of tread surface. It will be evident that during a run, at every revolution of the wheel, the foot-piece will meet the ground and such contact will actuate the piston to inject a proportional amount of air into the tube (4), the piston being returned by action of the inclosed spring and thus automatically expand the tire to a full circle beyond which the foot-piece cannot operate, should this part strike a stone the lug 9' and the fastenings are designed to lift the vehicle and pass over the same, in case of a side-swipe against the curb it will swerve the machine away from the point of contact. The action of the rod, piston, inlet and outlet valves do not materially differ from that of common steam, water or air pumps, the motion being limited by the setting of the foot-piece upon the end of rod 15 which should operate close to the outer side of the tire.

Having thus described my invention and being aware that air pumps are commonly used for inflating purposes, I hereby point out that which I claim as new and desire to secure by Letters Patent which is:—

1. In an automatic compensative air-injector for automobiles, the combination of hub clamps with coöperative bolt fastenings for stable application, a projected lug serviceable to guide and guard the piston rod, a foot-piece adjustable to various tire diameters, a piston and inclosing cylinder provided with end and side valves with a flexible tube connection to the air-chamber of the wheel tire, substantially as set forth.

2. In an automatic pneumatic tire inflator, the combination of hub clamps with coöperative bolt fastenings for stable application, the basic projected lugs serviceable to guide and guard the piston rods, duplicate foot-pieces, each adjustable to various tire diameters and the tubular constructed air-pumps jointly contributory to a single intervening air-reservoir having a single flexible tube connection to the air-chamber of the wheel tire substantially as set forth.

ROBERT C. BARRIE.

Witnesses:
W. H. HOOD,
L. E. SMITH.